United States Patent [19]
Turtle

[11] 3,788,140
[45] Jan. 29, 1974

[54] ELECTROACOUSTICAL FLOW METERING APPARATUS

[75] Inventor: Quentin C. Turtle, Cranston, R.I.

[73] Assignee: General Signal Corporation, Rochester, N.Y.

[22] Filed: Feb. 25, 1972

[21] Appl. No.: 229,352

[52] U.S. Cl. ............................... 73/194 A, 73/213
[51] Int. Cl. ............................................. G01f 1/00
[58] Field of Search. 73/194 A, 211, 213, 181, 182, 73/3

[56] References Cited
UNITED STATES PATENTS

| | | | |
|---|---|---|---|
| 2,826,912 | 3/1958 | Kritz | 73/194 A |
| 3,686,946 | 8/1972 | Halmi | 73/213 |
| 3,387,492 | 6/1968 | Mannherz et al. | 73/194 EM |
| 3,406,569 | 10/1968 | Rohmann | 73/194 EM |
| 2,971,329 | 2/1961 | Barry | 73/181 X |
| 3,702,144 | 11/1972 | Loveland | 138/44 |

*Primary Examiner*—Charles A. Ruehl
*Attorney, Agent, or Firm*—George Vande Sande; Jeffrey S. Mednick

[57] ABSTRACT

The disclosure concerns electroacoustical flow metering apparatus in which the transponder probes define an acoustic path located in the throat of a differential pressure-producing flow metering device.

4 Claims, 1 Drawing Figure

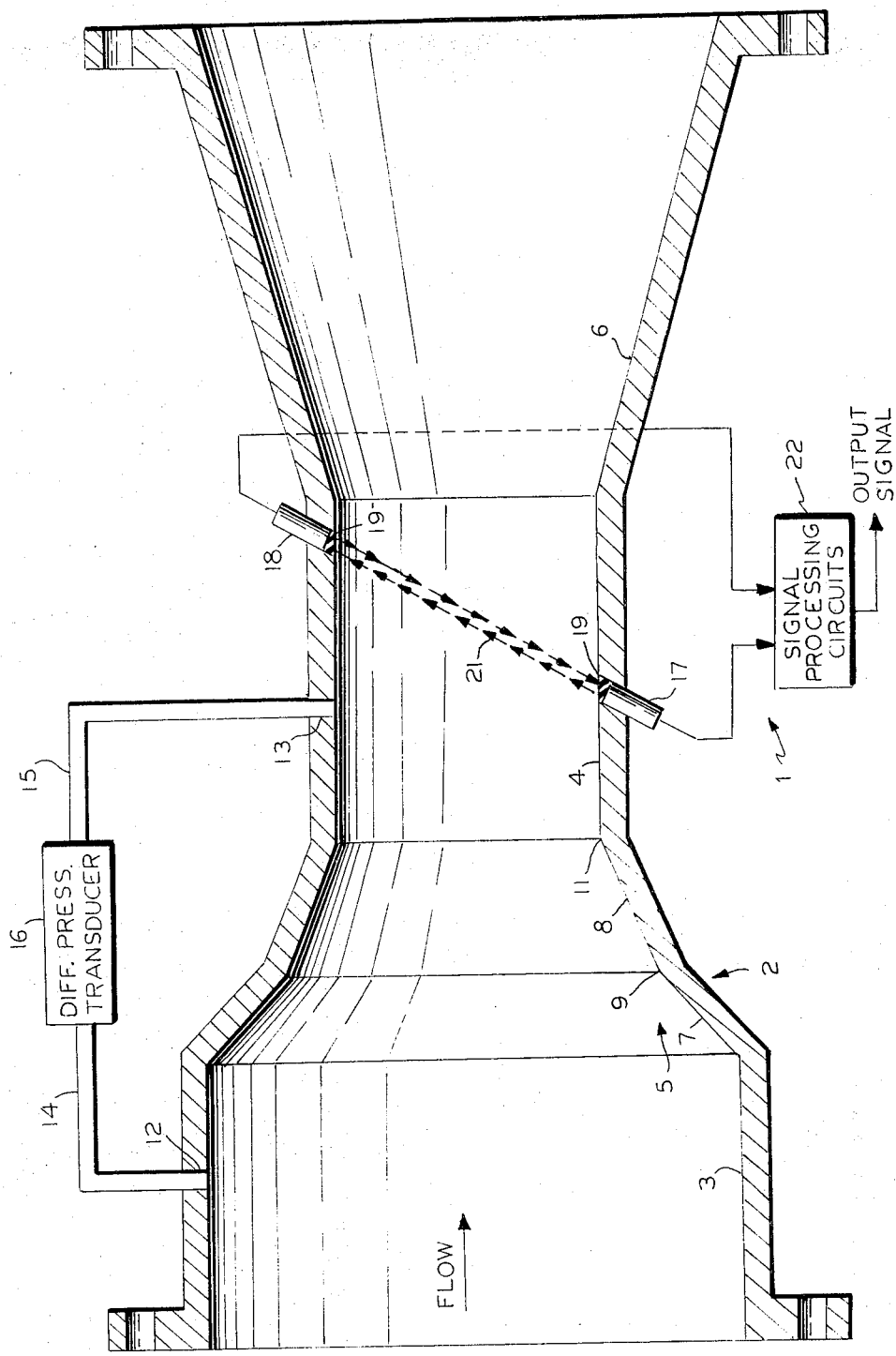

ELECTROACOUSTICAL FLOW METERING APPARATUS

BACKGROUND AND SUMMARY OF THE INVENTION

The electroacoustical flow meter is a known type of measuring instrument which utilizes the Doppler effect to produce an output signal which is proportional to rate of flow. The meter includes at least two aligned transponder probes which generate and receive pressure pulses transmitted along an acoustic path which crosses the flow stream. This path is inclined with respect to the stream, so the velocities of propogation in opposite directions along the path differ by an amount proportional to twice the velocity of the stream. This phenomenon is utilized in one of two ways. In one type of acoustic meter, sucessive pulses are transmitted in opposite directions along the acoustic path, and the difference between the transit times is then computed and translated into a rate of flow indication. In another type of acoustic meter, the transponders generate groups of pulses in succession, the generation rate for each being determined by the rate at which the pulses are received by the other probe. The frequencies of the two pulse trains are then compared to determine the difference which is then translated into the rate of flow signal.

It is recognized in the art that the accuracy of the sonic meter is affected by the shape of the velocity profile across the flowing stream, and that the simple two probe scheme is acceptable only in cases where this profile is symmetrical about the axis of the pipe or condiut in which the fluid is flowing. In cases where asymmetrical flow patterns are encountered, a plurality of sonic paths, and consequently several pairs of probes, must be used. This expedient naturally increases considerably the cost of the meter.

The primary object of this invention is to provide an improved type of sonic meter which can accurately meter the rate of flow of a stream having an asymmetrical flow pattern using only one sonic path and a single pair of transponder probes. According to the invention, the transponder probes of the acoustic meter are associated with, and define an acoustic path across, the throat of a differential pressure-producing type of flow meter. Meters of the last mentioned type are characterized by a converging section which accelerates the fluid stream and, as an incident thereto, normalizes its velocity profile. Therefore, abnormalities in the entering stream are corrected before the stream reaches the acoustic meter, and, as a result, that meter can afford accurate measurements using only the simple two-probe set up. The flow pattern-normalizing effect is particularly pronounced in differential pressure producers of the type described in U.S. Pat. No. 3,686,946, dated Aug. 29, 1972, so the preferred apparatus utilizes this type of tube. However, the classical or Herschel Venturi may also be used.

In addition to the main advantage just mentioned, the invention also affords the following desirable features:

1. The flow velocity in the region of the acoustic path necessarily is higher than in the remainder of the piping; consequently the differences between transit times or frequencies which the acoustic meter detects are much greater than would be encountered if the acoustic meter were utilized in the conventional manner. As a result, metering errors are reduced.

2. The increased velocity in the throat exerts a scouring action which tends to minimize deposition of grease and solids on the wall of the acoustic metering section. This is important because the sonic meter is calibrated for a metering section of fixed cross sectional area.

3. The inclusion of a high quality differential pressure producer allows the calibration of the acoustic meter to be checked easily in the field, using simple, familiar procedures and without the necessity for removing the sonic meter from the pipe line.

BRIEF DESCRIPTION OF THE DRAWING

The preferred embodiment of the invention is described herein with reference to the accompanying drawing whose single FIGURE is a schematic representation of the improved metering apparatus.

DESCRIPTION OF ILLUSTRATED EMBODIMENT

As shown in the drawing, the acoustic meter 1 is associated with a flanged universal differential pressure-producing flow meter 2 of the type described in U.S. Pat. No. 3,686,946. The universal meter comprises a tube having an inlet section 3 which may be cylindrical or rectangular, a constricted throat 4 of similar cross-sectional configuration, a converging section 5 for leading fluid to the throat, and a recovery cone 6. Converging section 5 consists of a pair of portions 7 and 8 of tapering cross-section which intersect along an edge 9, and the downstream one of which intersects throat 4 along an edge 11. These edges 9 and 11 are sharp, or at least not intentionally rounded. As explained in the aforementioned Patent, edge 9 causes the fluid to form a vena contracta and then expand and attach to the wall of portion 8, and edge 11 causes the fluid to form a second, but less pronounced vena contracta and then reattach to the wall of throat 4. Meter 2 also includes a pair of taps 12 and 13 for sensing the static pressures in the inlet 3 and throat 4, respectively; the throat tap 13 being located at the station where the fluid expanding from the second vena contracta attaches to the throat wall. Since meter 2 is not the primary measuring instrument the outlets from taps 12 and 13 normally are plugged. However, when meter 2 is used to check the calibration of acoustic meter 1, these taps are connected by tubes 14 and 15, respectively, to a differential pressure transducer 16, usually in the form of a manometer.

The flow pattern-controlling effect of meter 2 increases as the ratio of the throat area to inlet area decreases. Therefore, it is recommended that the ratio be as small as permitted by the head loss requirements of the particular installation for which the metering apparatus is intended.

The acoustic meter 1 may be of conventionl design and includes two transponder probes 17 and 18, each of which serves alternately as a pulse transmitter or a pulse receiver. Probes 17 and 18 are mounted in aligned bores formed through the wall of throat 4 and centered in a plane which contains the axis of the throat. The wedge shaped spaces at the inner ends of the probe bores preferably are filled with masses 19 of a suitable rubber or plastic which are dressed flush with the wall of throat 4. The probes are offset form each other in the axial direction so that the acoustic path 21 which they define forms an oblique angle with the axis of the throat. It is essential that acoustic path 21 traverse a section of throat 4 which is completely filled with fluid, and, therefore, this path must be located downstream of the station where the fluid expanding from the second vena contracta attaches to the throat wall, which dictates that the throat be of sufficient longitudinal dimension to achieve the result.

The signal processing circuits 22 associated with probes 17 and 18 may be designed to afford either of the two basic modes of meter operation mentioned earlier. However, since the calibration of meters using the frequency comparison mode is independent of the sonic velocity of the fluid being metered, it is preferred that circuits affording this mode of operation be employed.

The preceding description, both general and specific, assumes turbulent flow in the stream being metered. This is the condition normally encountered in water-metering applications because the Reynolds Number usually is several orders of magnitude higher than the laminar-turbulent transition range. The invention, however, may also be used to meter media, such as sewage sludge, which are characterized by a laminar flow condition. In these applications, the differential pressure producer 2 still serves to accelerate the stream and afford the scouring and error-reducing effects attributable to the higher velocity in the metering section of acoustic meter 1, but it should not be expected that edges 9 and 11 will create vena contractas, or that converging section 5 will have much effect upon the velocity profile. However, the lessening or absence of flow pattern control is not a real disadvantage in this application because abnormalities in the velocity profile under the laminar flow condition are not as great and do not persist as long as the abnormalities which occur under the turbulent flow condition. It might also be noted that, when the differential pressure producer 2 of a sludge meter is used to check operation of the associated acoustic meter 1, a less viscous medium, e.g. water, must be substituted for the sludge. This change is necessary in order to produce the higher Reynolds Number which meter 2 requires for satisfactory metering performance.

I claim:
1. Flow metering apparatus comprising
   a. a differential pressure-producing flow meter including an inlet section, a throat of reduced cross section, a converging section for leading fluid from the inlet section to the throat, and a pair of pressure taps for sensing differential pressure, at least one of said taps being in the throat;
   b. an electroacoustical flow meter including two opposed transponder probes associated with the throat and located at opposite ends of an acoustic path which extends diametrically across the throat at an oblique angle to the axis thereof; and
   c. said converging section including a tapering portion which intersects the throat along an edge and the two probes are so positioned that the acoustic path is located downstream of the position where the vena contracta rejoins the wall of the throat.
2. Flow metering apparatus as in claim 1, wherein the other of said pressure taps is in the inlet section.
3. Flow metering apparatus as in claim 1, wherein the converging section includes a first and second tapering portion which intersect each other along an edge.
4. Flow metering apparatus as in claim 1, wherein the probes are also downstream of the throat tap.

* * * * *